United States Patent
Salamah et al.

(10) Patent No.: US 6,720,687 B2
(45) Date of Patent: Apr. 13, 2004

(54) WAKE REDUCTION STRUCTURE FOR ENHANCING CAVITY FLOW IN GENERATOR ROTOR ENDWINDINGS

(75) Inventors: Samir Armando Salamah, Niskayuna, NY (US); Todd Garrett Wetzel, Niskayuna, NY (US); Christian Lee Vandervort, Voorheesville, NY (US); Emil Donald Jarczynski, Scotia, NY (US); Wayne Nigel Owen Turnbull, Clifton Park, NY (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/742,281

(22) Filed: Dec. 22, 2000

(65) Prior Publication Data

US 2002/0079752 A1 Jun. 27, 2002

(51) Int. Cl.⁷ .............. H02K 1/32; H02K 9/00; H02K 9/06; H02K 3/24; H02K 5/18
(52) U.S. Cl. .................. 310/61; 310/65; 310/264; 310/270
(58) Field of Search ................. 310/61, 65, 264, 310/270

(56) References Cited

U.S. PATENT DOCUMENTS

| | | | | |
|---|---|---|---|---|
| 1,819,860 A | * | 8/1931 | Belfils | 310/61 |
| 1,927,890 A | * | 9/1933 | Fechheimer | 171/207 |
| 2,786,951 A | * | 3/1957 | Morgan | 310/61 |
| 2,833,944 A | * | 5/1958 | Willyoung | 310/61 |
| 2,844,746 A | * | 7/1958 | Coggeshall | 310/65 |
| 3,225,231 A | * | 12/1965 | Kudlacik | 310/64 |
| 3,465,183 A | * | 9/1969 | Wallenstein | 310/54 |
| 3,846,651 A | * | 11/1974 | Mishra | 310/61 |
| 4,071,790 A | * | 1/1978 | Darby et al. | 310/59 |

(List continued on next page.)

OTHER PUBLICATIONS

Patent Abstracts of Japan; Vol 006, No. 155 (E–125) Aug. 17, 1982; JP 57 078350 dated May 17, 1982.
Patent Abstracts of Japan; Vol 006, No. 155 (E–125) Aug. 17, 1982; JP 57 078338 dated May 17, 1982.
U.S. application Ser. No. 09/739,358, filed Dec. 19, 2000.
U.S. application Ser. No. 09/742,279, filed Dec. 22, 2000.

Primary Examiner—Burton S. Mullins
Assistant Examiner—Pedro J. Cuevas
(74) Attorney, Agent, or Firm—Nixon & Vanderhye PC

(57) ABSTRACT

A gas cooled dynamoelectric machine is provided that is comprised of a rotor, a rotor winding comprising axially extending coils and concentric endwindings, and a plurality of spaceblocks located between adjacent endwindings thereby to define a plurality of cavities, each bounded by adjacent spaceblocks and adjacent endwindings. To enhance the heat transfer rate from the copper end turns of the field endwinding region, at least one spaceblock has a trailing edge or downstream wall contoured to reduce generated wake. In a preferred embodiment, the trailing edge has an aerodynamic contour to reduce the extent and strength of the generated wake.

16 Claims, 6 Drawing Sheets

U.S. PATENT DOCUMENTS

| | | | |
|---|---|---|---|
| 4,141,669 A | * 2/1979 | Darby et al. | 408/1 R |
| 4,301,386 A | * 11/1981 | Schweder et al. | 310/59 |
| 4,335,324 A | * 6/1982 | Fujioka et al. | 310/61 |
| 4,352,034 A | * 9/1982 | Karhan et al. | 310/59 |
| 4,365,177 A | * 12/1982 | Madsen | 310/61 |
| 4,403,755 A | * 9/1983 | Gutsche | 244/53 R |
| 4,415,822 A | * 11/1983 | Aiba | 310/59 |
| 4,486,676 A | * 12/1984 | Moore et al. | 310/52 |
| 4,543,503 A | * 9/1985 | Kaminski et al. | 310/59 |
| 4,546,279 A | * 10/1985 | Hammer et al. | 310/59 |
| 4,553,722 A | * 11/1985 | Cole | 244/219 |
| 4,656,382 A | * 4/1987 | Moore et al. | 310/270 |
| 4,709,177 A | * 11/1987 | Kaminski | 310/59 |
| 4,922,147 A | * 5/1990 | Sismour, Jr. et al. | 310/61 |
| 4,967,465 A | * 11/1990 | Frank | 29/598 |
| 5,136,951 A | * 8/1992 | Herrlinger | 102/340 |
| 5,252,880 A | * 10/1993 | Kazmierczak et al. | 310/270 |
| 5,332,362 A | * 7/1994 | Toulmay et al. | 416/223 R |
| 5,593,274 A | * 1/1997 | Carreno et al. | 415/115 |
| 5,644,179 A | 7/1997 | Staub et al. | 310/65 |
| 5,749,542 A | * 5/1998 | Hamstra et al. | 244/53 B |
| 6,204,580 B1 | * 3/2001 | Kazmierczak | 310/52 |
| 6,252,318 B1 | * 6/2001 | Kazmierczak | 310/61 |
| 6,339,268 B1 | * 1/2002 | Kaminski et al. | 310/61 |
| 6,346,754 B1 | * 2/2002 | Kieda et al. | 310/58 |
| 6,392,326 B1 | * 5/2002 | Turnbull et al. | 310/270 |
| 6,417,586 B1 | * 7/2002 | Jarczynski et al. | 310/61 |
| 6,452,294 B1 | * 9/2002 | Vandervort et al. | 310/64 |
| 6,462,458 B1 | * 10/2002 | Tong et al. | 310/270 |
| 6,465,917 B2 | * 10/2002 | Wetzel et al. | 310/61 |
| 6,495,943 B2 | * 12/2002 | Wetzel et al. | 310/264 |
| 6,617,749 B2 | * 9/2003 | Salamah et al. | 310/270 |
| 6,628,020 B1 | * 9/2003 | Tong | 310/61 |

* cited by examiner

WAKE REDUCTION STRUCTURE FOR ENHANCING CAVITY FLOW IN GENERATOR ROTOR ENDWINDINGS

BACKGROUND OF THE INVENTION

The invention relates to a structure for enhanced cooling of generator rotors.

The power output rating of dynamoelectric machines, such as large turbo-generators, is often limited by the ability to provide additional current through the rotor field winding because of temperature limitations imposed on the electrical conductor insulation. Therefore, effective cooling of the rotor winding contributes directly to the output capability of the machine. This is especially true of the rotor end region, where direct, forced cooling is difficult and expensive due to the typical construction of these machines. As prevailing market trends require higher efficiency and higher reliability in lower cost, higher-power density generators, cooling the rotor end region becomes a limiting factor.

Turbo-generator rotors typically consist of concentric rectangular coils mounted in slots in a rotor. The end portions of the coils (commonly referred to as endwindings), which are beyond the support of the main rotor body, are typically supported against rotational forces by a retaining ring (see FIG. 1). Support blocks, also referred to as spaceblocks, are placed intermittently between the concentric coil endwindings to maintain relative position and to add mechanical stability for axial loads, such as thermal loads (see FIG. 2). Additionally, the copper coils are constrained radially by the retaining ring on their outer radius, which counteracts centrifugal forces. The presence of the spaceblocks and retaining ring results in a number of coolant regions exposed to the copper coils. The primary coolant path is axial, between the spindle and the bottom of the endwindings. Also, discrete cavities are formed between coils by the bounding surfaces of the coils, spaceblocks and the inner surface of the retaining ring structure. The endwindings are exposed to coolant that is driven by rotational forces from radially below the endwindings into these cavities (see FIG. 3). This heat transfer tends to be low. This is because according to computed flow pathlines in a single rotating end winding cavity from a computational fluid dynamic analysis, the coolant flow enters the cavity, traverses through a primary circulation and exits the cavity. Typically, the circulation results in low heat transfer coefficients especially near the center of the cavity. Thus, while this is a means for heat removal in the endwindings, it is relatively inefficient.

Various schemes have been used to route additional cooling gas through the rotor end region. All of these cooling schemes rely on either (1) making cooling passages directly in the copper conductors by machining grooves or forming channels in the conductors, and then pumping the gas to some other region of the machine, and/or (2) creating regions of relatively higher and lower pressures with the addition of baffles, flow channels and pumping elements to force the cooling gas to pass over the conductor surfaces.

Some systems penetrate the highly stressed rotor retaining ring with radial holes to allow cooling gas to be pumped directly alongside the rotor endwindings and discharged into the air gap, although such systems can have only limited usefulness due to the high mechanical stress and fatigue life considerations relating to the retaining ring.

If the conventional forced rotor end cooling schemes are used, considerable complexity and cost are added to rotor construction. For example, directly cooled conductors must be machined or fabricated to form the cooling passages. In addition, an exit manifold must be provided to discharge the gas somewhere in the rotor. The forced cooling schemes require the rotor end region to be divided into separate pressure zones, with the addition of numerous baffles, flow channels and pumping elements which again add complexity and cost.

If none of these forced or direct cooling schemes are used, then the rotor endwindings are cooled passively. Passive cooling relies on the centrifugal and rotational forces of the rotor to circulate gas in the blind, dead-end cavities formed between concentric rotor windings. Passive cooling of rotor endwindings is sometimes also called "free convection" cooling.

Passive cooling provides the advantage of minimum complexity and cost, although heat removal capability is diminished when compared with the active systems of direct and forced cooling. Any cooling gas entering the cavities between concentric rotor windings must exit through the same opening since these cavities are otherwise enclosed— the four "side walls" of a typical cavity are formed by the concentric conductors and the insulating spaceblocks that separate them, with the "bottom" (radially outward) wall formed by the retaining ring that supports the endwindings against rotation. Cooling gas enters from the annular space between the conductors and the rotor spindle. Heat removal is thus limited by the low circulation velocity of the gas in the cavity and the limited amount of the gas that can enter and leave these spaces.

In typical configurations, the cooling gas in the end region has not yet been fully accelerated to rotor speed, that is, the cooling gas is rotating at part rotor speed. As the fluid is driven into a cavity by means of the relative velocity impact between the rotor and the fluid, the heat transfer coefficient is typically highest near the spaceblock that is downstream relative to the flow direction—where the fluid enters with high momentum and where the fluid coolant is coldest. The heat transfer coefficient is also typically high around the cavity periphery. The center of the cavity receives the least cooling.

Increasing the heat removal capability of passive cooling systems will increase the current carrying capability of the rotor providing increased rating capability of the generator whole maintaining the advantage of low cost, simple and reliable construction.

U.S. Pat. No. 5,644,179, the disclosure of which is incorporated by reference describes a method for augmenting heat transfer by increasing the flow velocity of the large single flow circulation cell by introducing additional cooling flow directly into, and in the same direction as, the naturally occurring flow cell. This is shown in FIGS. 4 and 5. While this method increases the heat transfer in the cavity by augmenting the strength of the circulation cell, the center region of the rotor cavity was still left with low velocity and therefore low heat transfer. The same low heat transfer still persists in the corner regions.

As is apparent from the foregoing, spaceblocks are an essential feature of generator endwindings. In addition to defining the cavity spaces between concentric rotor coils where the cooling of the endwinding occurs, the spaceblocks enhance the cooling flow entrained into the cavity. However, in the process of inducing this cavity cooling flow, the spaceblocks generate a wake that can disturb the performance of downstream cavities.

BRIEF SUMMARY OF THE INVENTION

The invention relates to a method and structure for enhanced cooling of generator rotors and, more particularly, to an improved spaceblock trailing edge contour for reducing generated wake while maintaining the spaceblock's ability to introduce cooling flow into the cavity.

In an embodiment of the invention, the adverse effects of spaceblock protrusion into the annular cavity between the endwindings and the stator core on downstream cavities is minimized while maintaining its beneficial feature of enhancing the cooling flow into the cavity disposed upstream thereof. As noted above, the negative effect of spaceblocks is the result of wake generated by the spaceblock that impacts downstream cavities. The present invention provides an aerodynamic contour for the trailing edge of at least some spaceblocks to reduce the extent and strength of the generated wake while maintaining the spaceblocks ability to induce cooling flow into the cavity. The present invention also provides strategic locations for these reshaped spaceblocks.

In an exemplary embodiment of the invention, the reduction in wake is achieved by reshaping the trailing edge of the spaceblock from a rectangular profile as is conventional to a more streamlined contour. Preferably existing spaceblocks are modified to provide the contoured configuration, thus facilitating its incorporation in the overall design.

Thus, the invention is embodied in a gas cooled dynamoelectric machine, comprising a rotor having a body portion, the rotor having axially extending coils and end turns defining a plurality of endwindings extending axially beyond at least one end of the body portion; and at least one spaceblock located between adjacent the endwindings so as to define a cavity therebetween. The spaceblock has first and second sidewall portions engaging the adjacent endwindings, an upstream wall, and a downstream wall. To reduce generated wake, the downstream wall of the spaceblock has a non-planar contour. The non-planar contour of the downstream wall is preferably an aerodynamic contour to reduce the extent and strength of the generated wake, most preferably a generally parabolic curve.

BRIEF DESCRIPTION OF THE DRAWINGS

These, as well as other objects and advantages of this invention, will be more completely understood and appreciated by careful study of the following more detailed description of the presently preferred exemplary embodiments of the invention taken in conjunction with the accompanying drawings, in which.

DETAILED DESCRIPTION OF THE INVENTION

Figure 1:
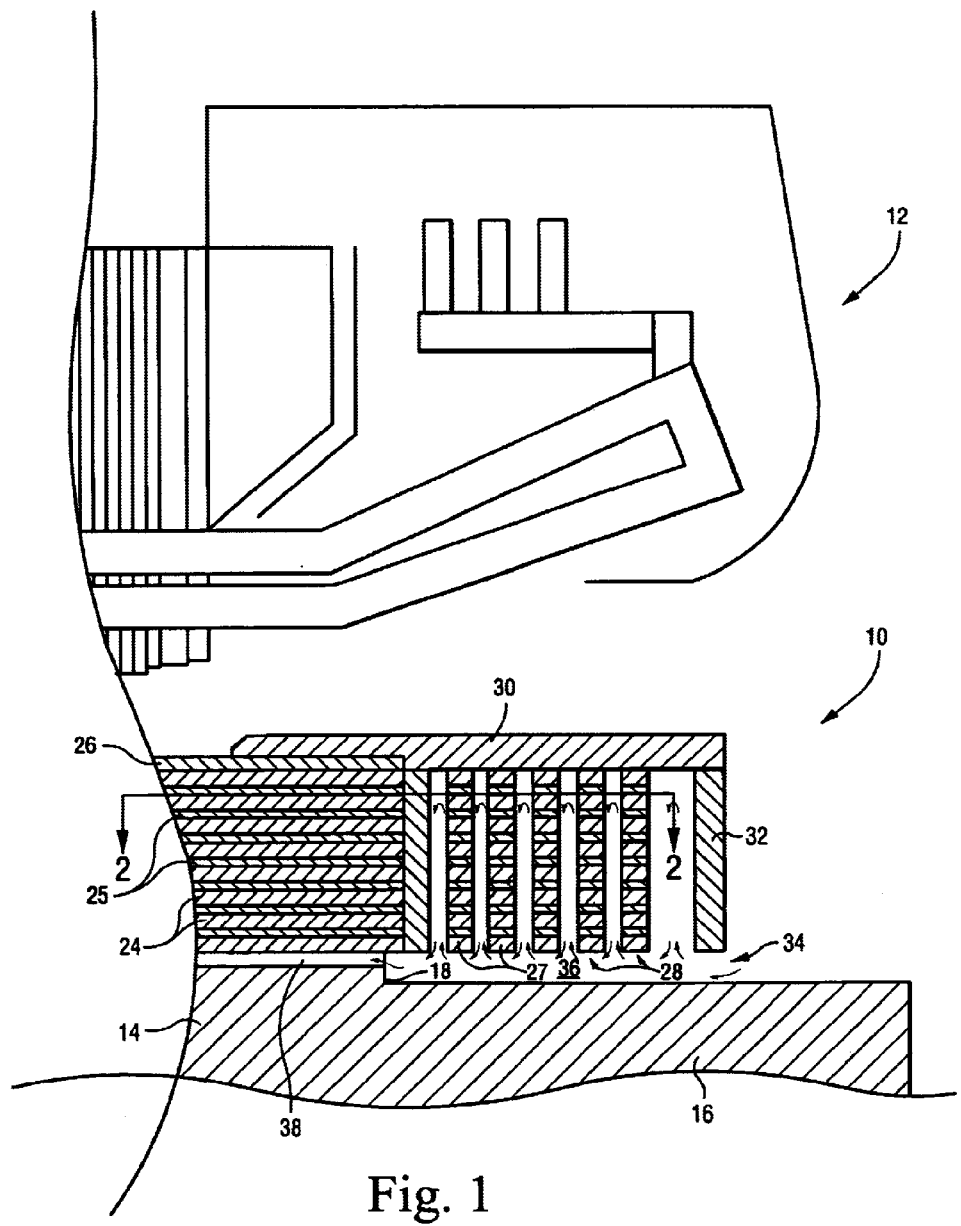
FIG. 1 is a cross-sectional view of a portion of the end turn region of a dynamoelectric machine rotor with stator in opposed facing relation thereto.
Figure 2:
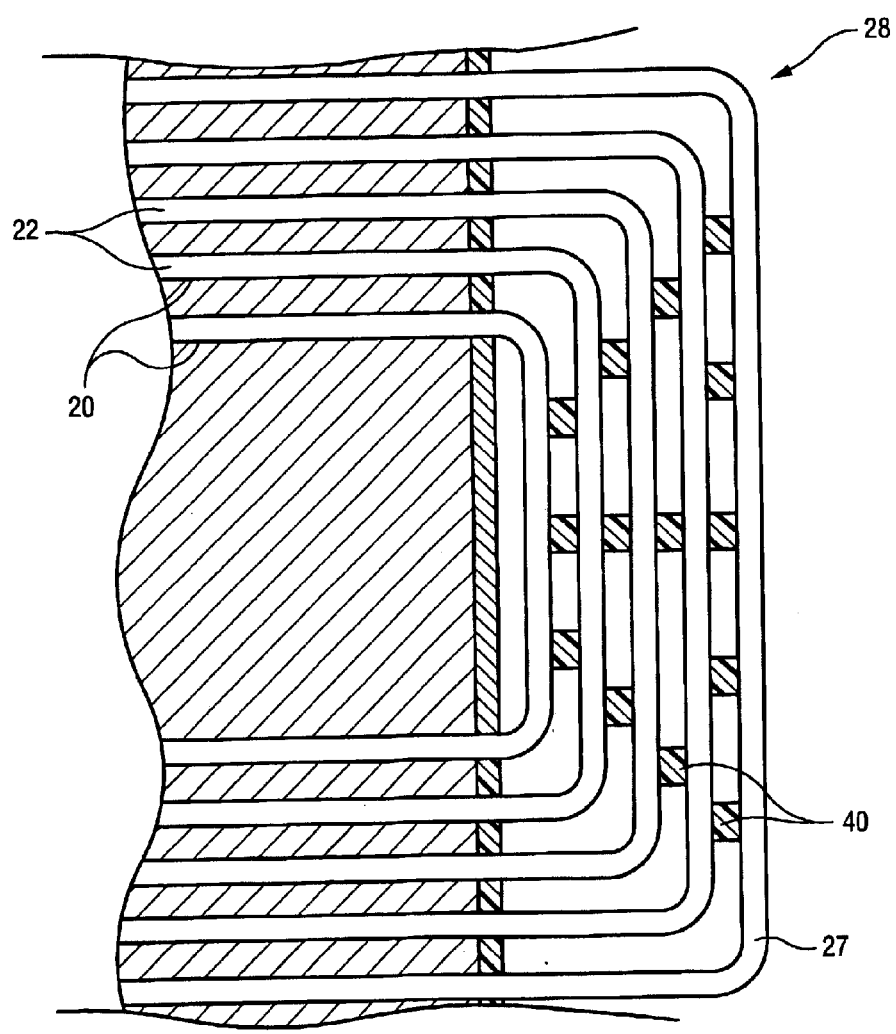
FIG. 2 is a cross-sectional top view of the dynamoelectric machine rotor taken along line 2—2 of FIG. 1.

Referring to the drawings wherein identical reference numerals denote the same elements throughout the various views, FIGS. 1 and 2 show a rotor 10 for a gas-cooled dynamoelectric machine, which also includes a stator 12 surrounding the rotor. The general operation of dynamoelectric machines such as large turbo-generators is well known and needs not be described here. The rotor includes a generally cylindrical body portion 14 centrally disposed on a rotor spindle 16 and having axially opposing end faces, of which a portion 18 of one end face is shown in FIG. 1. The body portion is provided with a plurality of circumferentially-spaced, axially extending slots 20 for receiving concentrically arranged coils 22, which make up the rotor winding. For clarity, only five rotor coils are shown, although several more are commonly used in practice.

Specifically, a number of conductor bars 24 constituting a portion of the rotor winding are stacked in each one of the slots. Adjacent conductor bars are separated by layers of electrical insulation 25. The stacked conductor bars are typically maintained in the slots by wedges 26 (FIG. 1) and are made of a conductive material such as copper. The conductor bars 24 are interconnected at each opposing end of the body portion by end turns 27, which extend axially beyond the end faces to form stacked endwindings 28. The end turns are also separated by layers of electrical insulation.

Referring specifically to FIG. 1, a retaining ring 30 is disposed around the end turns 27 at each end of the body portion to hold the endwindings in place against centrifugal forces. The retaining ring is fixed at one end to the body portion and extends out over the rotor spindle 16. A centering ring 32 is attached to the distal end of the retaining ring 30. It should be noted that the retaining ring 30 and the center ring 32 can be mounted in other ways, as is known in the art. The inner diameter of the centering ring 32 is radially spaced from the rotor spindle 16 so as to form a gas inlet passage 34 and the endwindings 28 are spaced from the spindle 16 so as to define an annular region 36. A number of axial cooling channels 38 formed along slots 20 are provided in fluid communication with the gas inlet passage 34 via the annular region 36 to deliver cooling gas to the coils 22.

Figure 3:
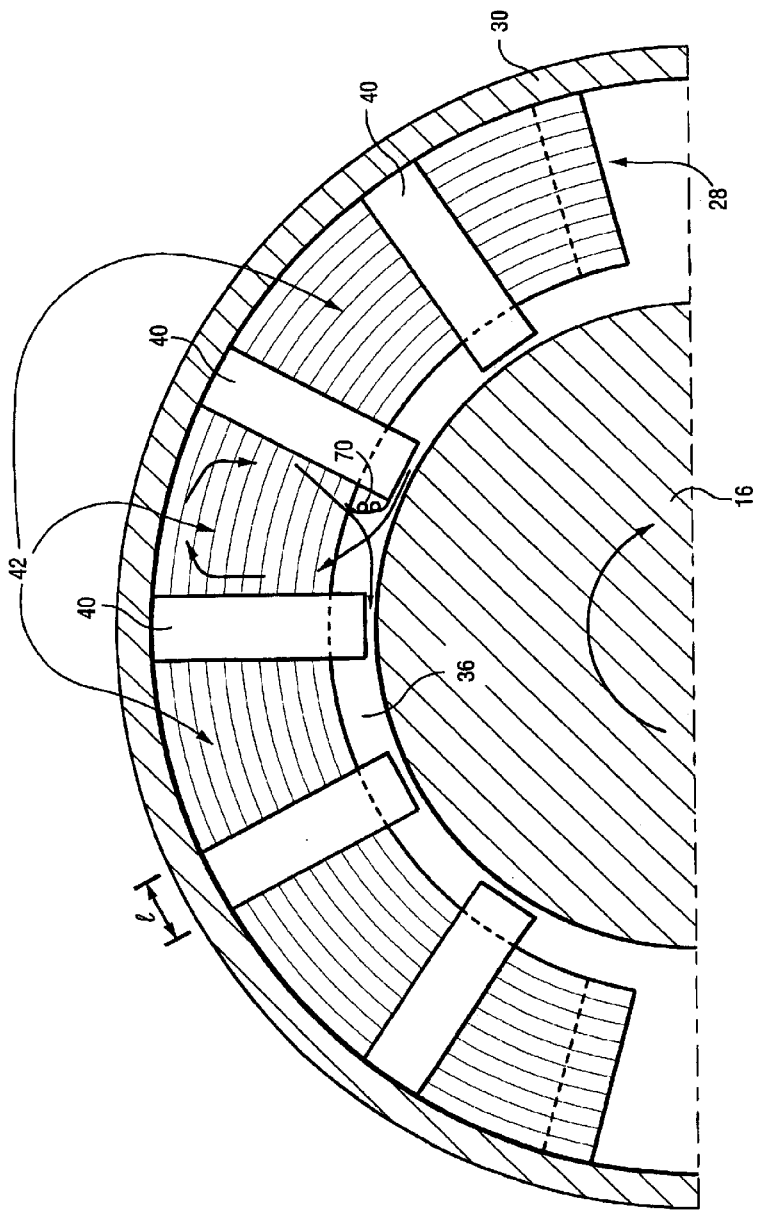
FIG. 3 is a schematic illustration showing passive gas flow into and through endwinding cavities.

Turning to FIG. 2, the endwindings 28 at each end of the rotor 10 are circumferentially and axially separated by a number of spacers or spaceblocks 40. (For clarity of illustration, the spaceblocks are not shown in FIG. 1). The spaceblocks are elongated blocks of an insulating material located in the spaces between adjacent endwindings 28 and extend beyond the full radial depth of the endwindings into the annular gap 36. Accordingly, the spaces between the concentric stacks of the end turns (hereinafter endwindings) are divided into cavities. These cavities are bounded on the top by the retaining ring 30 and on four sides by adjacent endwindings 28 and adjacent spaceblocks 40. As best seen in FIG. 1, each of these cavities is in fluid communication with the gas inlet passage 34 via the annular region 36. A portion of the cooling gas entering the annular region 36 between the endwinding 28 and the rotor spindle 16 through the gas inlet passage 34 thus enters the cavities 42, circulates therein, and then returns to the annular region 36 between the endwinding and the rotor spindle. Air flow is shown by the arrows in FIGS. 1 and 3. The inherent pumping action and rotational forces acting in a rotating generator cavity produce a large single flow circulation cell, as schematically shown in FIG. 3.

As noted above, the spaceblocks 40 complete the definition of the cavities 42 formed between consecutive coils of the rotor endwindings 28 in an electric power generator. The spaceblocks also serve to enhance the entrainment of the cooling fluid in the respective cavities. More specifically, as explained above, an annular passage 36 is formed between the radially inner surfaces of the endwindings 28 and the spindle 16. The primary rotor cooling gas flows axially and circumferentially through the annular passage 36. A fluid entrainment action of the cooling fluid flow into the rotating cavities 42 results from the interaction between the protrusion of the spaceblocks 40 into the annular passage and the relative tangential velocity of the flow in the annulus.

Figure 4:
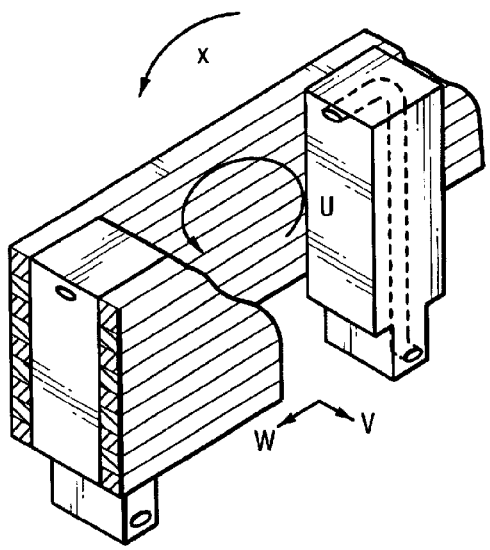
FIG. 4 is a perspective view, partly broken-away of a portion of the rotor end turn region in accordance with a first embodiment of the invention disclosed in U.S. Pat. No. 5,644,179.
Figure 5:
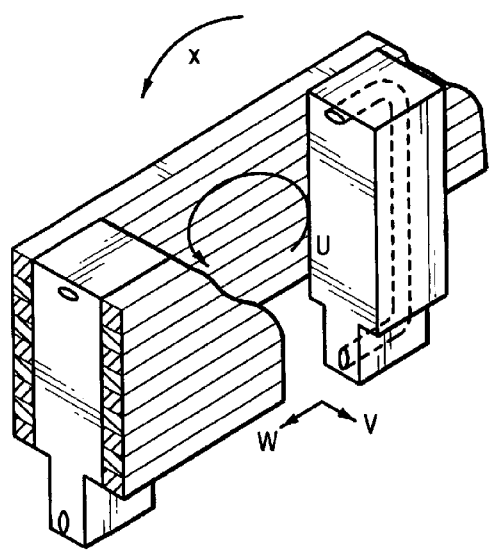
FIG. 5 is a perspective view, partly broken away, of a portion of the rotor end turn region showing a second embodiment of the invention of U.S. Pat. No. 5,644,179.

With reference by way of example to FIG. 4, the cooling gas velocity relative to the inner radius of the rotor endwinding has velocity components V and W respectively in the axial and circumferential directions, as shown therein. The relative velocities drive the circulation velocity U inside the cavity. A large protrusion of the spaceblock and/or large relative tangential velocities will lead to greater amounts of fluid flow being introduced into the respective cavities by the associated spaceblocks. One of the byproducts of the interaction, however, is a wake, as shown by reference numeral 70 in FIG. 3, that forms at the trailing edge of the spaceblock 40 and persists for some distance downstream of the spaceblock protrusion. The extent and strength of this wake is also proportional to the relative tangential velocity of the flow in the annular passage. Analyses of the contours of relative tangential velocity indicate that the wake that emanates from the first row of spaceblocks is the strongest and persists the longest due to the higher relative tangential velocity of the annular flow in this stage of the endwinding region.

Figure 6:
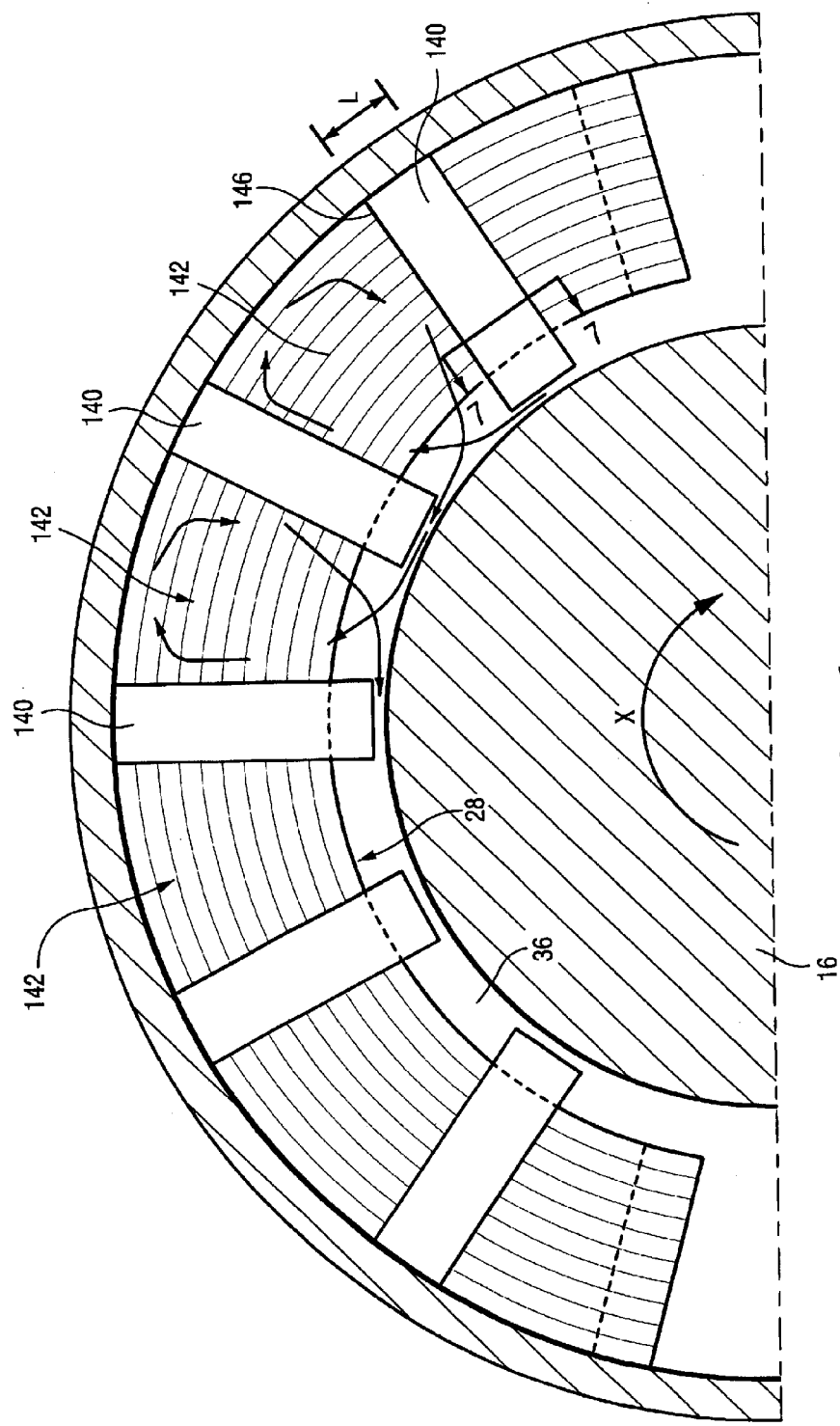
FIG. 6 is a partial cross-sectional view similar to FIG. 3, illustrating a reshaped spaceblock according to an embodiment of the invention.
Figure 7:
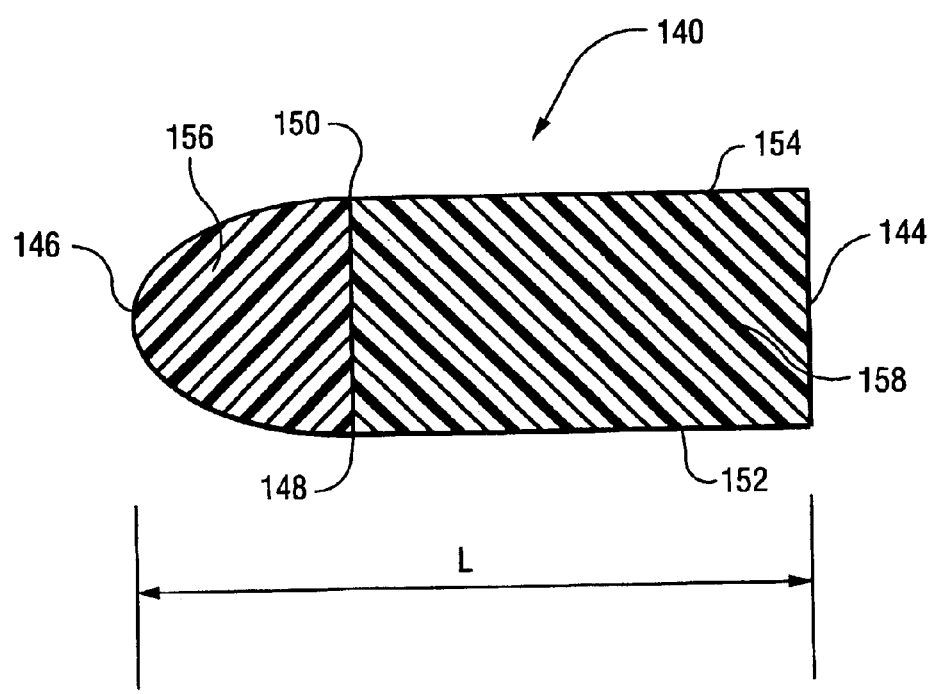
FIG. 7 is a schematic cross-sectional view taken along line 7—7 of FIG. 6.

As illustrated in FIGS. 6 and 7, the invention proposes to streamline the trailing edge of the spaceblock to reduce the strength of the wake. As is evident from the discussion above, the present invention would be expected to have the strongest impact on the first (axial) row of spaceblocks, as it is there that the wake is strongest and persists the longest due to the higher relative tangential velocity of the annular flow in this stage of the endwinding region. To continue to permit the induction of flow into upstream cavity, the leading edge of the spaceblock is not altered in the presently preferred embodiment.

Referring more specifically to FIG. 6, there is illustrated a partial section of the rotor endwinding showing a series of cavities 142 with the direction of rotation indicated by arrow X. As noted above, the cooling gas velocity relative to the inner radius of the rotor endwinding has component velocities V and W respectively in the axial and circumferential directions. The relative velocities drive the circulation velocity inside the cavity. In accordance with an embodiment of the invention, at least one spaceblock 140, preferably at least the spaceblocks of the first axial row of spaceblocks, and potentially each spaceblock, is provided with a modified profile in cross-section to provide a more aerodynamic contour, particularly at the trailing edge, to reduce the extent and strength of generated wake. More specifically, the spaceblock 140 has first and second sidewall portions 152, 154 for engaging adjacent endwindings 28, an upstream wall 144, and a downstream wall 146. To reduce generated wake, the downstream wall 146 has a non-planar contour. In the illustrated embodiment, the downstream wall 146, which is disposed on the upstream side of the downstream adjacent cavity 142 has an aerodynamic contour, most preferably a parabolicly curved contour, to reduce the extent and strength of the generated wake.

As schematically illustrated in FIG. 7, the spaceblock 140 may be provided as an assembly of a main body portion 158 of generally rectangular cross-section and a wake reducing protrusion portion 156 that is generally smoothly contoured. Where the spaceblock is provided as a two part assembly, the protrusion portion 156 may be retrofitted to a conventional spaceblock 40, in which case the spaceblock assembly 140 will have a circumferential length, identified by reference "L" in FIGS. 6 and 7, that is greater than the circumferential length "l" of a conventional spaceblock 40. Most preferably, however, the spaceblock 140 is provided as an integrated one piece structure, including the generally flat side wall portions 152, 154 for engaging the respective endwindings 28 and which transition to the smoothly contoured rearward wall 146. The spaceblock 140 has a generally flat upstream wall 144 in the illustrated embodiment, as in the conventional structure, to continue to permit the introduction of flow into the upstream cavity.

While a generally parabolic curve is shown in the presently preferred embodiment, a less pronounced curve may be provided while still eliminating the 90 degree corners at each rearward edge 148, 150 of the sidewalls 152, 154 of the spaceblock main body 158. To further guide and direct flow while reducing wake, the radially inner end of the spaceblock, particularly at the radially inner end of the wake reducing protrusion 156, may be inclined or smoothly contoured as well.

In operation, rotor rotation will cause cooling gas to be drawn through the gas inlet passage 34 into the annular region 36 between the endwindings 28 and the rotor spindle 16. As mentioned above, the cooling gas flow will have axial and circumferential velocity components V and W, respectively. Thus, a kinetic pressure head is present which drives cooling gas through the annular region 36 and into the respective cavities 142. The projection of the spaceblocks 140 into the annular region also induces a portion of the cooling fluid to flow into and circulate through the respective cooling cavities. The contoured rearward wall 146 of the respective spaceblocks 140 reduces the extent and strength of the generated wake to minimize the adverse effect of the spaceblock protrusion on the cavity 142 downstream therefrom.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A gas cooled dynamoelectric machine, comprising:
    a rotor having a body portion, said rotor having axially extending coils and end turns defining a plurality of endwindings extending axially beyond at least one end of said body portion; and
    at least one spaceblock located between adjacent said endwindings so as to define a cavity therebetween, said spaceblock having first and second sidewall portions engaging said adjacent endwindings, an upstream wall, and a downstream wall, said downstream wall of said spaceblock having a convexly curved, aerodynamic contour for reducing the extent and strength of the generated wake.

2. The dynamoelectric machine of claim 1, wherein said downstream wall is defined as a generally parabolic curve.

3. The dynamoelectric machine of claim 1, wherein said upstream wall is generally planar.

4. The dynamoelectric machine of claim 1, wherein said spaceblock is comprised of a generally rectangular main body portion and a protrusion portion, said main body portion defining said upstream wall and said sidewall portions, and said protrusion portion defining said downstream wall.

5. The dynamoelectric machine of claim 4, wherein said downstream wall is defined as a generally parabolic curve.

6. The dynamoelectric machine of claim 4, wherein said upstream wall is generally planar.

7. The dynamoelectric machine of claim 4, wherein said protrusion portion is integrally formed with said main body portion.

8. A gas cooled dynamoelectric machine, comprising:

a rotor having a spindle and a body portion;

a rotor winding comprising axially extending coils disposed on said body portion and spaced, concentric endwindings extending axially beyond at least one end of said body portion, said endwindings and said spindle defining an annular space therebetween;

a plurality of spaceblocks located between adjacent ones of said endwindings thereby to define a plurality of cavities, each bounded by adjacent spaceblocks and adjacent endwindings and open to said annular space; and each said spaceblock having first and second sidewall portions engaging said adjacent endwindings, an upstream wall, and a downstream wall, said downstream wall of at least one of said spaceblocks having convexly curved, aerodynamic contour for reducing the extent and strength of the generated wake.

9. The dynamoelectric machine of claim 8, wherein said non-planar downstream wall is defined as a generally parabolic curve.

10. The dynamoetectric machine of claim 8, wherein said upstream wall of each said spaceblock is generally planar.

11. The dynamoelectric machine of claim 8, wherein said at least one spaceblock is comprised of a generally rectangular main body portion and a protrusion portion, said main body portion defining said upstream wall and said sidewall portions, and said protrusion portion defining said convexly curved, aerodynamic downstream wall.

12. The dynamoelectric machine of claim 11, wherein said downstream wall is defined as a generally parabolic curve.

13. The dynamoelectric machine of claim 11, wherein said upstream wall is generally planar.

14. The dynamoelectric machine of claim 11, wherein said protrusion portion is integrally formed with said main body portion.

15. The dynamoelectric machine of claim 1, further comprising a rotor spindle extending axially beyond said at least one end of said body portion and defining an annular space with said endwindings, and wherein said at least one spaceblock extends radially into said annular space.

16. The dynamoelectric machine of claim 8, wherein said plurality of spaceblocks extend radially into said annular space.

* * * * *

UNITED STATES PATENT AND TRADEMARK OFFICE
CERTIFICATE OF CORRECTION

PATENT NO. : 6,720,687 B2
APPLICATION NO. : 09/742281
DATED : April 13, 2004
INVENTOR(S) : Salamah et al.

It is certified that error appears in the above-identified patent and that said Letters Patent is hereby corrected as shown below:

Column 8, line 1, delete "dynamoetectric" and insert --dynamoelectric--.

Signed and Sealed this

Fifth Day of February, 2008

JON W. DUDAS
*Director of the United States Patent and Trademark Office*